US009693323B2

United States Patent
Mallik et al.

(10) Patent No.: US 9,693,323 B2
(45) Date of Patent: Jun. 27, 2017

(54) MULTI-CHANNEL CSI FEEDBACK FOR LTE/LTE-A WITH UNLICENSED SPECTRUM

(71) Applicant: QUALCOMM Incorporated, San Diego, CA (US)

(72) Inventors: Siddhartha Mallik, San Diego, CA (US); Tao Luo, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 14/922,724

(22) Filed: Oct. 26, 2015

(65) Prior Publication Data

US 2016/0119951 A1   Apr. 28, 2016

Related U.S. Application Data

(60) Provisional application No. 62/069,146, filed on Oct. 27, 2014.

(51) Int. Cl.
*H04W 52/34* (2009.01)
*H04L 5/00* (2006.01)
*H04L 27/00* (2006.01)

(52) U.S. Cl.
CPC .......... *H04W 52/346* (2013.01); *H04L 5/001* (2013.01); *H04L 5/0053* (2013.01); *H04L 5/0048* (2013.01); *H04L 27/0006* (2013.01)

(58) Field of Classification Search
CPC .... H04W 52/346; H04L 5/001; H04L 5/0053; H04L 5/0048; H04L 27/0006
See application file for complete search history.

(56) References Cited

U.S. PATENT DOCUMENTS

| 2015/0016376 A1* | 1/2015 | Seo ................. H04W 72/0406 370/329 |
| 2016/0050667 A1* | 2/2016 | Papasakellariou ......................... H04W 74/0808 370/329 |
| 2016/0066282 A1* | 3/2016 | Ouchi ...................... H04L 5/00 455/522 |

FOREIGN PATENT DOCUMENTS

WO    WO-2013185835 A1    12/2013

OTHER PUBLICATIONS

Huawei et al., "Review of Existing Unlicensed Spectrum Regulatory Requirements Affecting Physical Layer Design," 3GPP Draft; R1-143724, 3rd Generation Partnership Project (3GPP), Mobile Competence Centre . 650, Route Des Lucioles. F-06921 Sophia-Antipolis Cedex. France vol. RAN WG1, No. Ljubljana, Slovenia; Oct. 6, 2014-Oct. 10, 2014 Oct. 5, 2014 (Oct. 5, 2014), XP050875045, Retrieved from the Internet: URL:http://www.3gpp.org/ftp/Meetings_3GPP_SYNC/RAN1/Docs/ [retrieved on Oct. 5, 2014].

(Continued)

*Primary Examiner* — Duc C Ho
(74) *Attorney, Agent, or Firm* — Liem T. Do

(57) ABSTRACT

Multi-channel channel state information (CSI) design is disclosed for long term evolution (LTE)/LTE-Advanced (LTE-A) systems with unlicensed spectrum. A "reference" CSI process defined for each channel/carrier. The reference CSI process is defined across each channel in any particular band that the transmitter is configured to support. The transmit power for such reference CSI processes is spread equally over each such channel. In order to report CSI for a subset of channels under an unequal power split assumption, a user equipment (UE) may apply a different power offset in the computation of the CSI process. Alternatively, an auxiliary CSI process may be defined for reporting CSI of a (Continued)

subset of channels with unequal distribution of powers across different channels in a band.

30 Claims, 12 Drawing Sheets

(56) References Cited

OTHER PUBLICATIONS

International Search Report and Written Opinion—PCT/US2015/057632—ISA/EPO—Jan. 27, 2016.

\* cited by examiner

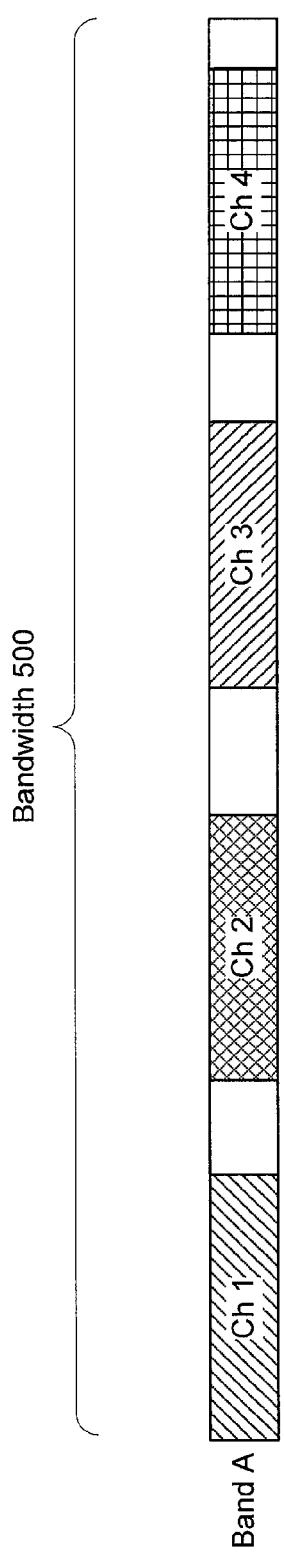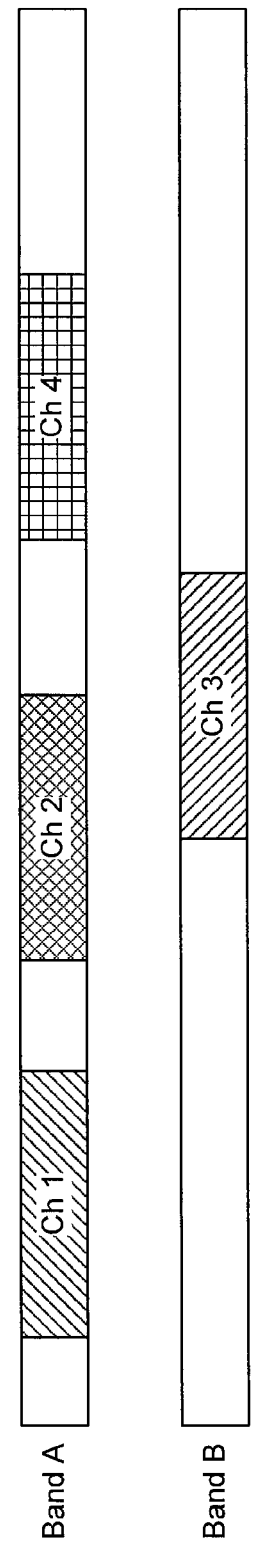
FIG. 5A
FIG. 5B

MULTI-CHANNEL CSI FEEDBACK FOR LTE/LTE-A WITH UNLICENSED SPECTRUM

CROSS-REFERENCE TO RELATED APPLICATIONS

This application claims the benefit of U.S. Provisional Patent Application No. 62/069,146, entitled, "MULTI-CHANNEL CSI FEEDBACK FOR LTE/LTE-A WITH UNLICENSED SPECTRUM," filed on Oct. 27, 2014, which is expressly incorporated by reference herein in its entirety.

BACKGROUND

Field

Aspects of the present disclosure relate generally to wireless communication systems, and more particularly, to multi-channel channel state information (CSI) feedback for long term evolution (LTE)/LTE-Advanced (LTE-A) with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes performing a clear channel assessment (CCA) check for one or more channels supported by a transmitter on one or more frequency bands serviced by the transmitter, transmitting indication of a reference channel state information (CSI) process on each of the one or more channels on which the CCA check is successful, wherein the reference CSI process is applicable to the one or more channels within the one or more frequency bands, and wherein a reference transmit power of the reference CSI process is indicated in the transmission as the maximum transmit power of each of the one or more frequency bands spread equally across the one or more channels of the corresponding one or more frequency bands. The method further includes receiving a CSI report from a UE for one or more of the one or more channels, wherein the CSI reports are based on either the reference CSI process, when the one or more of the one or more channels is all of the one or more channels, or a modified CSI report, when the one or more of the one or more channels is a subset of the one or more channels.

In an additional aspect of the disclosure, a method of wireless communication includes receiving indication of a reference CSI process on each of one or more frequency bands serviced by a serving transmitter, wherein the reference CSI process is applicable to the one or more channels supported by the serving transmitter within the one or more frequency bands, and wherein a reference transmit power of the reference CSI process is indicated as the maximum transmit power of each of the one or more frequency bands spread equally across the one or more channels of the corresponding one or more frequency bands. The method further includes receiving a schedule from the serving transmitter for one or more of the one or more channels and generating a CSI report for each of the scheduled one or more of the one or more channels, wherein each of the CSI reports is based on either the reference CSI process, when the scheduled one or more of the one or more channels is all of the one or more channels, or a modified CSI report, when the scheduled one or more of the one or more channels is a scheduled subset of the one or more channels.

In an additional aspect of the disclosure, an apparatus configured for wireless communication includes means for performing a CCA check for one or more channels supported by a transmitter on one or more frequency bands serviced by the transmitter, means for transmitting indication of a reference CSI process on each of the one or more channels on which the CCA check is successful, wherein the reference CSI process is applicable to the one or more channels within the one or more frequency bands, and wherein a reference transmit power of the reference CSI process is indicated in the transmission as the maximum transmit power of each of the one or more frequency bands spread equally across the one or more channels of the corresponding one or more frequency bands. The apparatus further includes means for receiving a CSI report from a UE for one or more of the one or more channels, wherein the CSI reports are based on either the reference CSI process, when the one or more of the one or more channels is all of the one or more channels, or a modified CSI report, when the one or more of the one or more channels is a subset of the one or more channels.

In an additional aspect of the disclosure, an apparatus configured for wireless communication includes means for receiving indication of a reference CSI process on each of one or more frequency bands serviced by a serving transmitter, wherein the reference CSI process is applicable to the one or more channels supported by the serving transmitter within the one or more frequency bands, and wherein a reference transmit power of the reference CSI process is indicated as the maximum transmit power of each of the one or more frequency bands spread equally across the one or more channels of the corresponding one or more frequency bands. The apparatus further includes means for receiving a schedule from the serving transmitter for one or more of the one or more channels and means for generating a CSI report for each of the scheduled one or more of the one or more channels, wherein each of the CSI reports is based on either the reference CSI process, when the scheduled one or more of the one or more channels is all of the one or more channels, or a modified CSI report, when the scheduled one or more of the one or more channels is a scheduled subset of the one or more channels.

In an additional aspect of the disclosure, a computer-readable medium having program code recorded thereon. This program code includes code to perform a CCA check for one or more channels supported by a transmitter on one or more frequency bands serviced by the transmitter, code to transmit indication of a reference CSI process on each of the one or more channels on which the CCA check is successful, wherein the reference CSI process is applicable to the one or more channels within the one or more frequency bands, and wherein a reference transmit power of the reference CSI process is indicated in the transmission as the maximum transmit power of each of the one or more frequency bands spread equally across the one or more channels of the corresponding one or more frequency bands. The program code further includes code to receive a CSI report from a UE for one or more of the one or more channels, wherein the CSI reports are based on either the reference CSI process, when the one or more of the one or more channels is all of the one or more channels, or a modified CSI report, when the one or more of the one or more channels is a subset of the one or more channels.

In an additional aspect of the disclosure, a computer-readable medium having program code recorded thereon. This program code includes code to receive indication of a reference CSI process on each of one or more frequency bands serviced by a serving transmitter, wherein the reference CSI process is applicable to the one or more channels supported by the serving transmitter within the one or more frequency bands, and wherein a reference transmit power of the reference CSI process is indicated as the maximum transmit power of each of the one or more frequency bands spread equally across the one or more channels of the corresponding one or more frequency bands. The program code further includes code to receive a schedule from the serving transmitter for one or more of the one or more channels and code to generate a CSI report for each of the scheduled one or more of the one or more channels, wherein each of the CSI reports is based on either the reference CSI process, when the scheduled one or more of the one or more channels is all of the one or more channels, or a modified CSI report, when the scheduled one or more of the one or more channels is a scheduled subset of the one or more channels.

In an additional aspect of the disclosure, an apparatus includes at least one processor and a memory coupled to the processor. The processor is configured to perform a CCA check for one or more channels supported by a transmitter on one or more frequency bands serviced by the transmitter, to transmit indication of a reference CSI process on each of the one or more channels on which the CCA check is successful, wherein the reference CSI process is applicable to the one or more channels within the one or more frequency bands, and wherein a reference transmit power of the reference CSI process is indicated in the transmission as the maximum transmit power of each of the one or more frequency bands spread equally across the one or more channels of the corresponding one or more frequency bands. The apparatus further includes configuration of the processor to receive a CSI report from a UE for one or more of the one or more channels, wherein the CSI reports are based on either the reference CSI process, when the one or more of the one or more channels is all of the one or more channels, or a modified CSI report, when the one or more of the one or more channels is a subset of the one or more channels.

In an additional aspect of the disclosure, an apparatus includes at least one processor and a memory coupled to the processor. The processor is configured to receive indication of a reference CSI process on each of one or more frequency bands serviced by a serving transmitter, wherein the reference CSI process is applicable to the one or more channels supported by the serving transmitter within the one or more frequency bands, and wherein a reference transmit power of the reference CSI process is indicated as the maximum transmit power of each of the one or more frequency bands spread equally across the one or more channels of the corresponding one or more frequency bands. The apparatus further includes configuration of the processor to receive a schedule from the serving transmitter for one or more of the one or more channels and to generate a CSI report for each of the scheduled one or more of the one or more channels, wherein each of the CSI reports is based on either the reference CSI process, when the scheduled one or more of the one or more channels is all of the one or more channels, or a modified CSI report, when the scheduled one or more of the one or more channels is a scheduled subset of the one or more channels.

BRIEF DESCRIPTION OF THE DRAWINGS

FIGS. 5A and 5B are block diagrams illustrating transmission bands in a multi-channel communication system.

DETAILED DESCRIPTION

Figure 1:
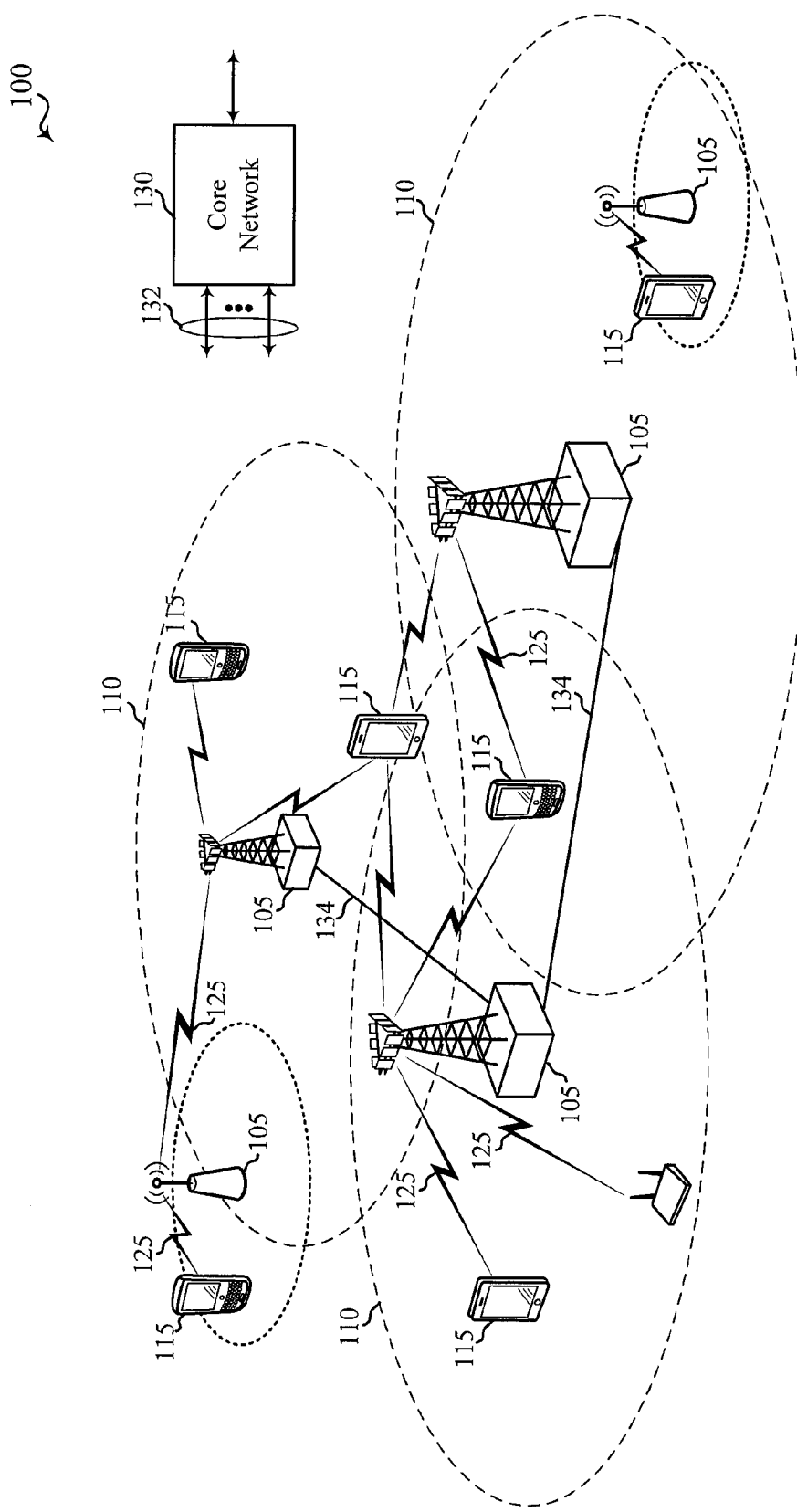
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above.

Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more unlicensed spectrum modes of operation or deployment scenarios. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., Si, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE/LTE-A with unlicensed spectrum), or both (LTE/LTE-A with/without unlicensed spectrum). Similarly, the uplink transmissions may be made using a licensed spectrum (e.g., LTE), an unlicensed spectrum (e.g., LTE/LTE-A with unlicensed spectrum), or both (LTE/LTE-A with/without unlicensed spectrum).

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A with unlicensed spectrum deployment scenarios or modes of operation in a system such as the system 100, as well as other features and functions related to the operation of LTE/LTE-A with unlicensed spectrum, are provided below with reference to FIGS. 2A-9.

Figure 2A:
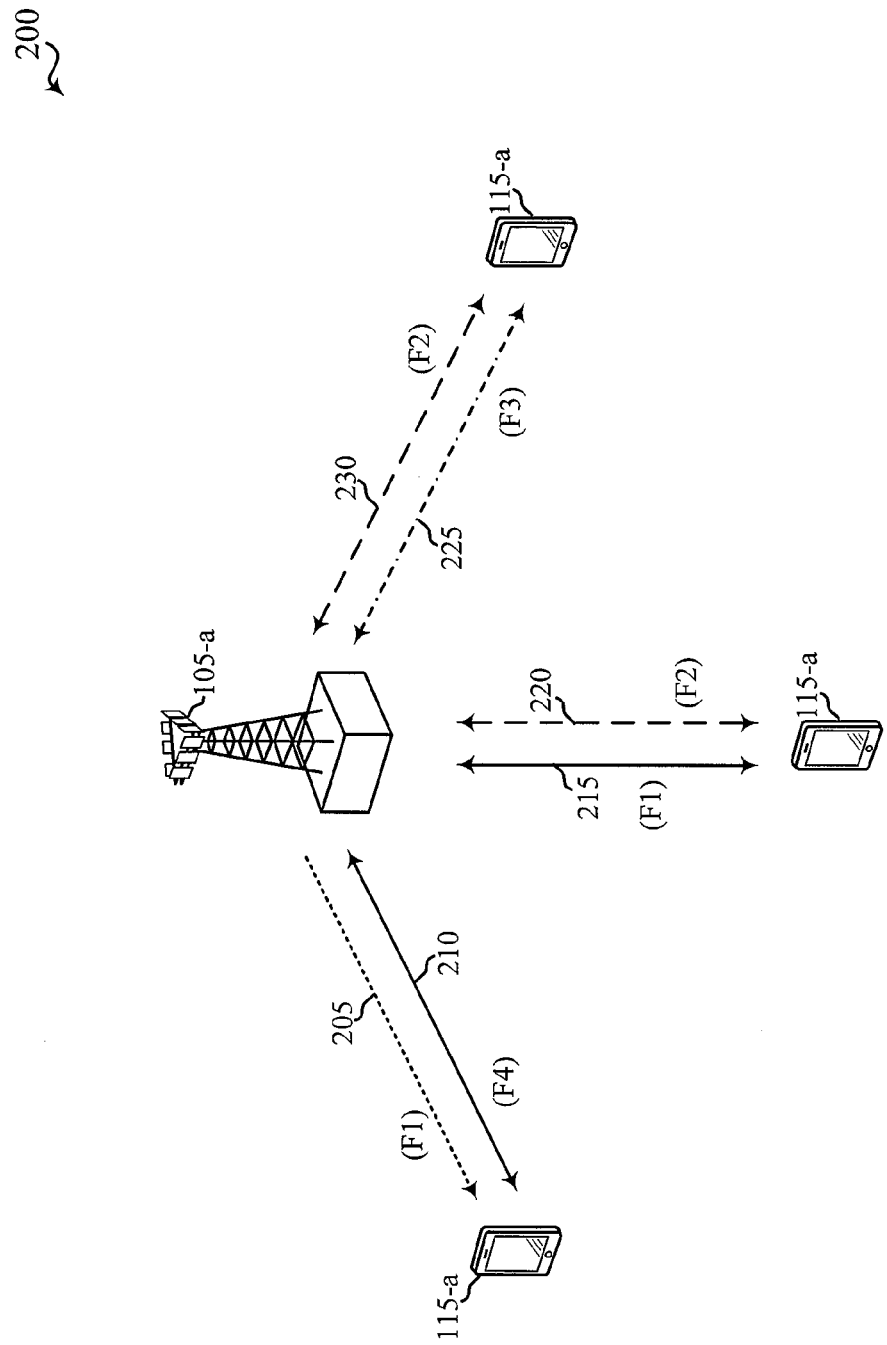
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
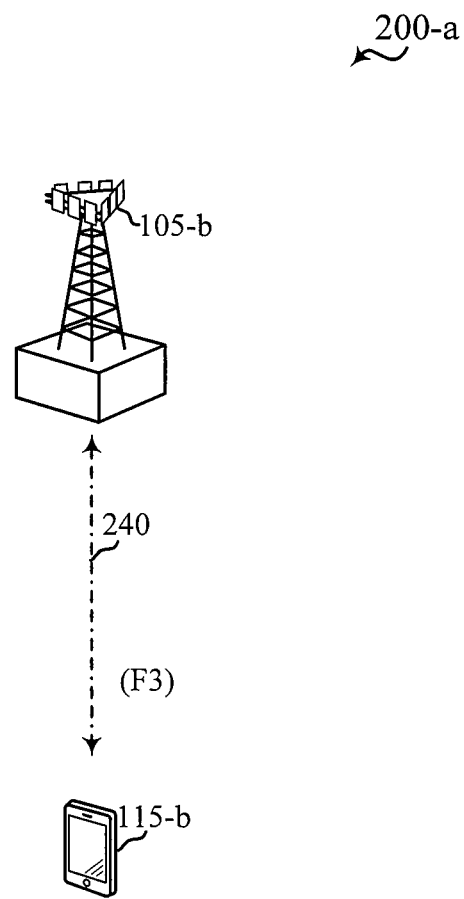
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
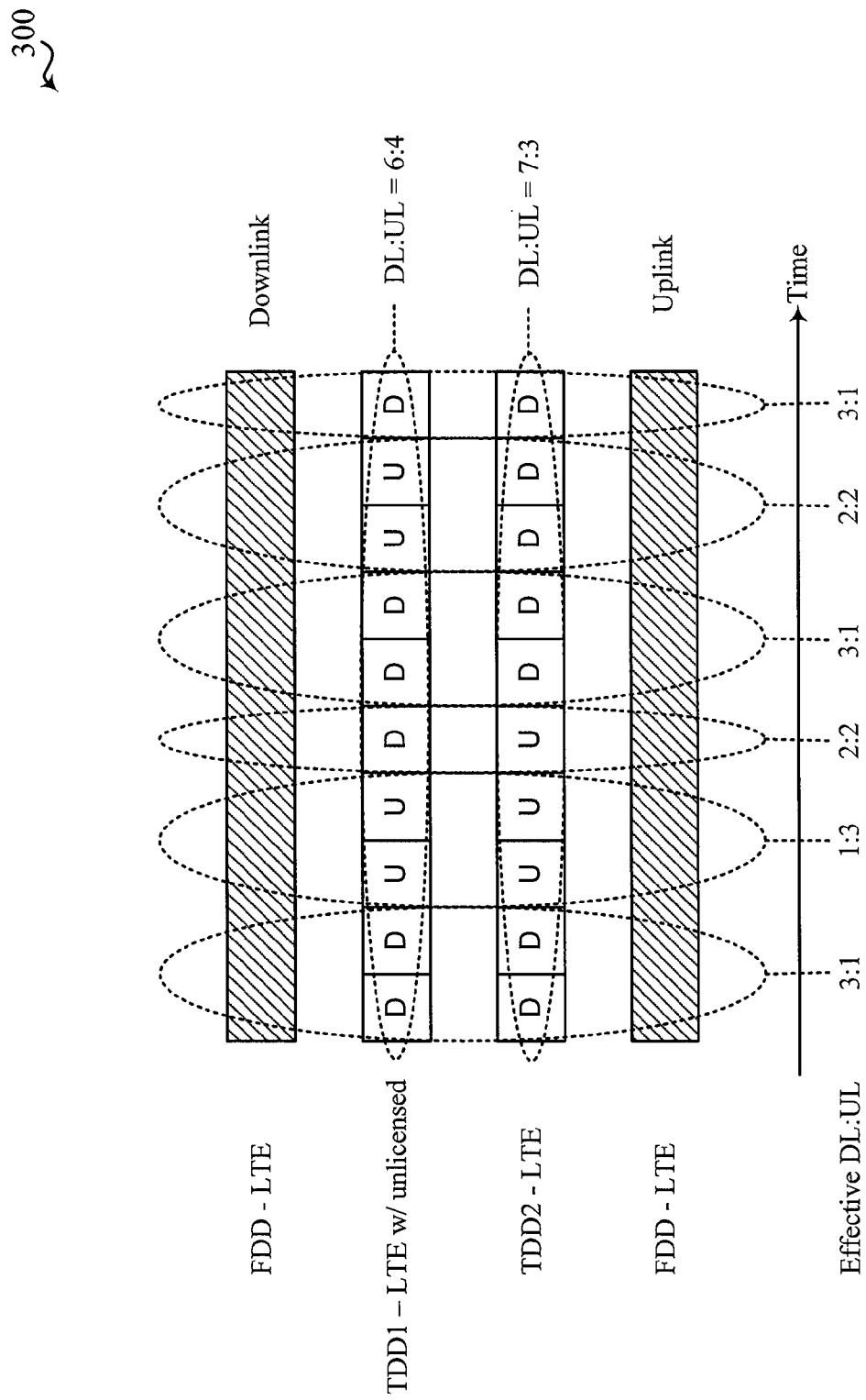
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 4:
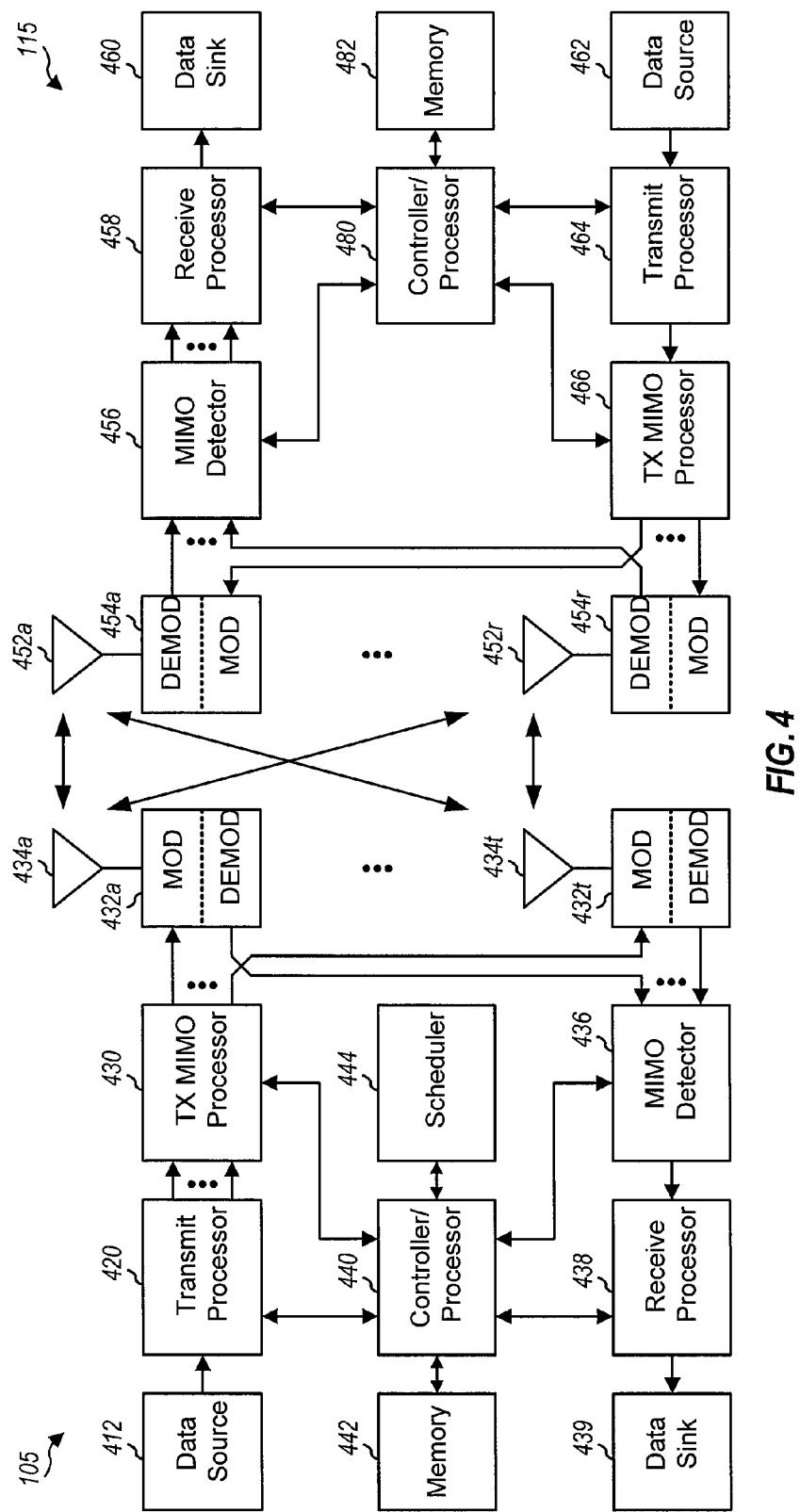
FIG. 4 is a block diagram illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 7 and 8, and/or other processes for the techniques described herein. The memories 442 and 482 may store data and program codes for the eNB 105 and the UE 115, respectively. A scheduler 444 may schedule UEs for data transmission on the downlink and/or uplink.

The unlicensed spectrum in the 5 GHz range is generally broken up into bands. Each band has a transmission power constraint. A channel is the minimum amount of spectrum used by a device. For example, in many LTE systems, including LTE/LTE-A systems with unlicensed spectrum, a channel may be defined around 20 MHz of bandwidth. A device uses one or more channels to span a band. In an LTE system if a devices uses four 20 MHz channels, the device will be capable of using 80 MHz across the entire band. A device may also use channels in multiple bands. A multi-channel design for LTE/LTE-A with unlicensed spectrum may reuse elements of the LTE carrier aggregation framework through use of a one-to-one mapping of channels to carriers.

In a single channel LTE/LTE-A with unlicensed spectrum, channel state indicator (CSI) feedback may occur by reusing the Rel-11 framework of CSI-reference signal (CSI-RS) processes. For example CSI-RS processes include a non-zero power (NZP) CSI-RS (NZP-CSI-RS), such as a pilot signal, for channel estimation and interference measurement resource (IMR), with zero power, for interference estimate. In the IMR process, a serving base station does not transmit anything to the UE, which allows the UE to compare channel conditions and measure interference from other nodes. In operation, the IMR of a CSI-RS process should not overlap with the NZP-CSI-RS transmission of other processes, in order to prevent traffic to pilot ratio (TPR) mismatch. Zero power (ZP) CSI-RS processes may be used for physical downlink shared channel (PDSCH) rate-matching. Because any data that is sent in PDSCH cannot occupy the same tones as the IMR or ZP CSI-RS, the ZP CSI-RS may be used for rate-matching in PDSCH.

The CSI-RS processes may be configured through the radio resource control (RRC) layer, handling both resource configuration and subframe configuration. For example, various parameters, such as frequency of CSI-RS, how often in time for the CSI-RS processes, resources in frequency to use, and the like, may be set in RRC communications. Selected processes may be UE-specific, which allows the system to specifically control CSI feedback within a particular coverage area. The Rel-11 CSI-RS framework applies to multiple CSI reporting modes, with support for wideband and subband CSI-RS, either selected by the UE or through higher-layer configuration.

In application over unlicensed spectrum, CSI-RS may be transmitted only when the transmitter detects a successful clear channel assessment (CCA). If the CCA frequently does not clear on the CSI-RS subframes, the CSI reports may become stale and/or inaccurate. In order to address such issues with such listen before talk (LBT) systems, either the periodicity of CSI-RS may be increased, which also increases overhead, or an aperiodic CSI-RS+IMR transmission may be used, to have an on-demand aperiodic CSI report.

Advanced systems such as LTE/LTE-A systems may also include multi-channel designs in which communications may occur over multiple channels over one or more frequency bands. FIGS. 5A and 5B are block diagrams illustrating transmission bands in a multi-channel communication system. In FIG. 5A, an eNB may be able to provide service in the frequency band, Band A, specifically supporting channels 1-4. Band A has a total bandwidth, bandwidth 500. For example, the total bandwidth of Band A may be 100 MHz, 80 MHz, or the like. The channels may be of various sizes, for example, 20 MHz, 10 MHz, and the like. For purposes of FIGS. 5A and 5B, each channel will be assumed to be a 20 MHz channel. As such, in FIG. 5A, the eNB supports four 20 MHz channels for a total available bandwidth in Band A of 80 MHz. As indicated in FIG. 5B, the multiple channels supported by an eNB or transmitter may span multiple bands. Channels 1, 2, and 4 are each located within Band A, while channel 3 is located in Band B.

According to various aspects of the present disclosure, when operating with a multi-channel CSI design in LTE/LTE-A systems with unlicensed spectrum, the carrier aggregation (CA) framework may be leveraged with a "reference" CSI process defined for each channel/carrier. For purposes of this application, the terms carrier and channel will be used interchangeably. A reference CSI process is a CSI process that is defined across each channel in any particular band that the transmitter is configured to support in which the transmit power is spread equally over each such channel. In defining the reference CSI process, the transmit power may be determined by spreading the maximum transmit power available to the transmitter for the band equally across all channels that the transmitter supports in that band. Different bands may have different reference CSI processes defined, and the maximum transmit power constraint may vary from band to band.

Figure 6A:
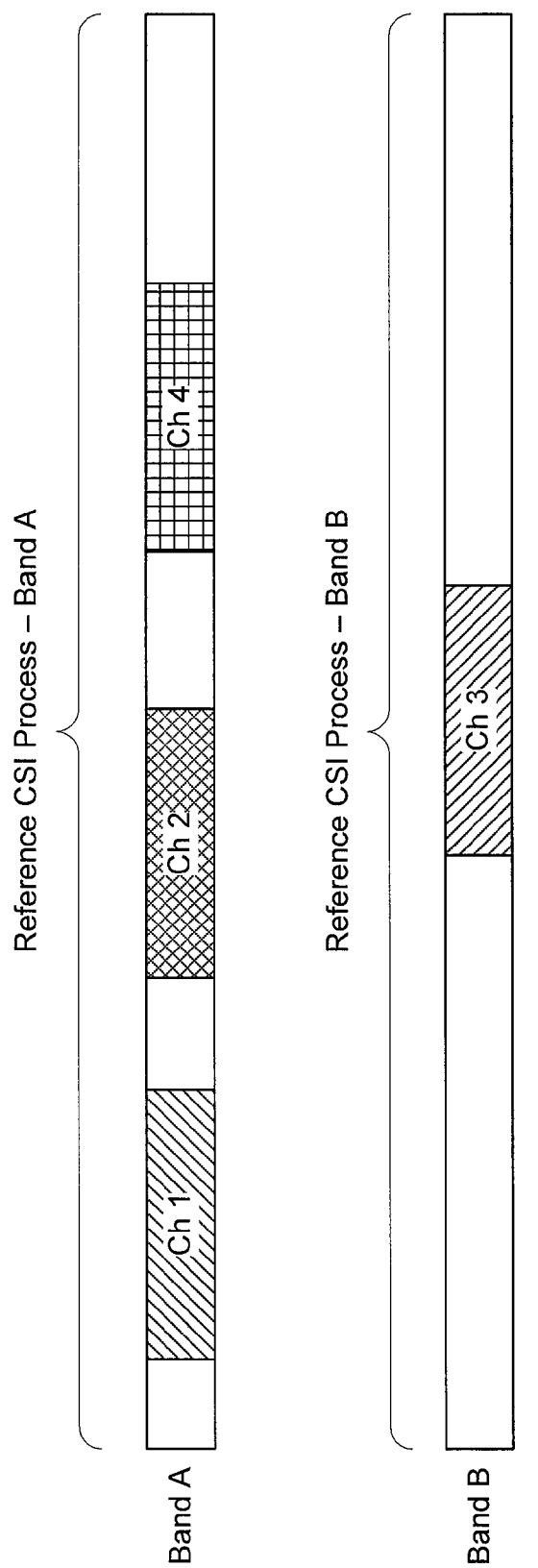
FIGS. 6A-6C are block diagrams illustrating multi-channel transmission bands configured according to aspects of the present disclosure.

FIG. 6A is a block diagram illustrating transmission bands in a multi-channel communication system configured according to one aspect of the present disclosure. An eNB provides service in both Band A and Band B supporting channels 1, 2, and 4 in Band A and channel 3 in Band B. A reference CSI process would be defined for each of Band A and Band B. The reference CSI process for Band A would be applied to each of channels 1, 2, and 4, with transmit power spread equally among the three channels. For example, if the maximum transmit power for Band A is 30 dBm, then the reference transmit power for each channel would be 10 dBM. The reference CSI process for Band B would only be applicable to channel 3 for the eNB, as the eNB only supports channel 3 within Band B. Thus, the maximum transmit power for Band B would be applied totally for the reference CSI process of channel 3.

In an additional example (not shown in FIG. 6A), another eNB transmitter may advertise in transmission messages that it supports four 20 MHz channels or 80 MHz within Band A. The reference CSI-RS process for Band A is spread over each of the four channels in the 80 MHz. A UE being served by the eNB transmitter would, according to the reference CSI-RS process, measure the channel quality indicator (CQI) for each of the four channels of the 80 MHz and transmit the CQI using the power offset, Pc, that was specifically advertised by the eNB in the transmitted message.

Figure 6B:
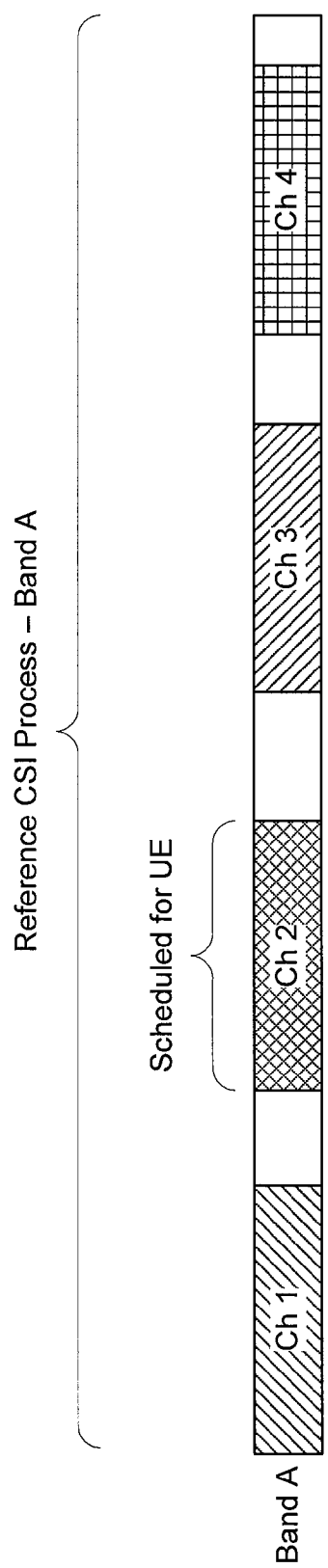

In some circumstances, an eNB may schedule a particular UE only over a subset of the total number of channels available in a band. FIG. 6B is a block diagram illustrating a multi-channel transmission band configured according to one aspect of the present disclosure. The eNB supports four 20 MHz channels, channels 1-4 within Band A. Out of this 80 MHz bandwidth, the eNB schedules a UE over only one 20 MHz channel, e.g., channel 2. In this case, the eNB would want to indicate an increase of power to the UE, instead of instructing the UE to transmit the CQI at one-fourth of the available power for the four total channels of the 80 MHz band under the reference CSI process.

According to one aspect of the present disclosure, in order to report CSI for a subset of channels in the Band A under an unequal power split assumption, the UE may apply a different power offset, Pc, in the computation of the CSI process for channel 2. As indicated above, when an eNB transmitter advertises the number of channels and bands it supports, the transmitter also includes a power offset value, Pc, that indicates the power offset that the UE should apply when reporting the measured CQI based on the particular CSI process. The example aspect would, instead, allow the UE to select a different power offset value, Pc, to use when reporting only for a subset of channels (e.g., channel 2) under the unequal power split assumption. In the described example, because the UE is measuring CQI for channel 2, which is one of the four channels (80 MHz) of the identified band, the UE would select a new power offset value, Pc, of four times the available power for the band. Thus, when making the CSI computations for the CSI-RS transmission, the UE will use the increased power offset value, Pc, for transmitting the CQI. By increasing the power offset value for the CQI transmission in the CSI-process for the subset of channels, the UE's reported CQI may be more accurate and allow the eNB to make a better selection of modulation and coding scheme (MCS) for the UE.

Instead of providing for the UE to select a new power offset value, additional aspects of the present disclosure may provide for defining auxiliary CSI processes for reporting CSI of a subset of channels with unequal distribution of powers across different channels in a band. Selecting a new power offset value, Pc, may not always lead to the best CQI when the UE is already operating in an area of low signal-to-noise ratio (SNR). In such low SNR environments, the channel estimates may already be noisy, which, when transmitted according to the increased power offset, would be amplified in the reported CQI.

Figure 6C:
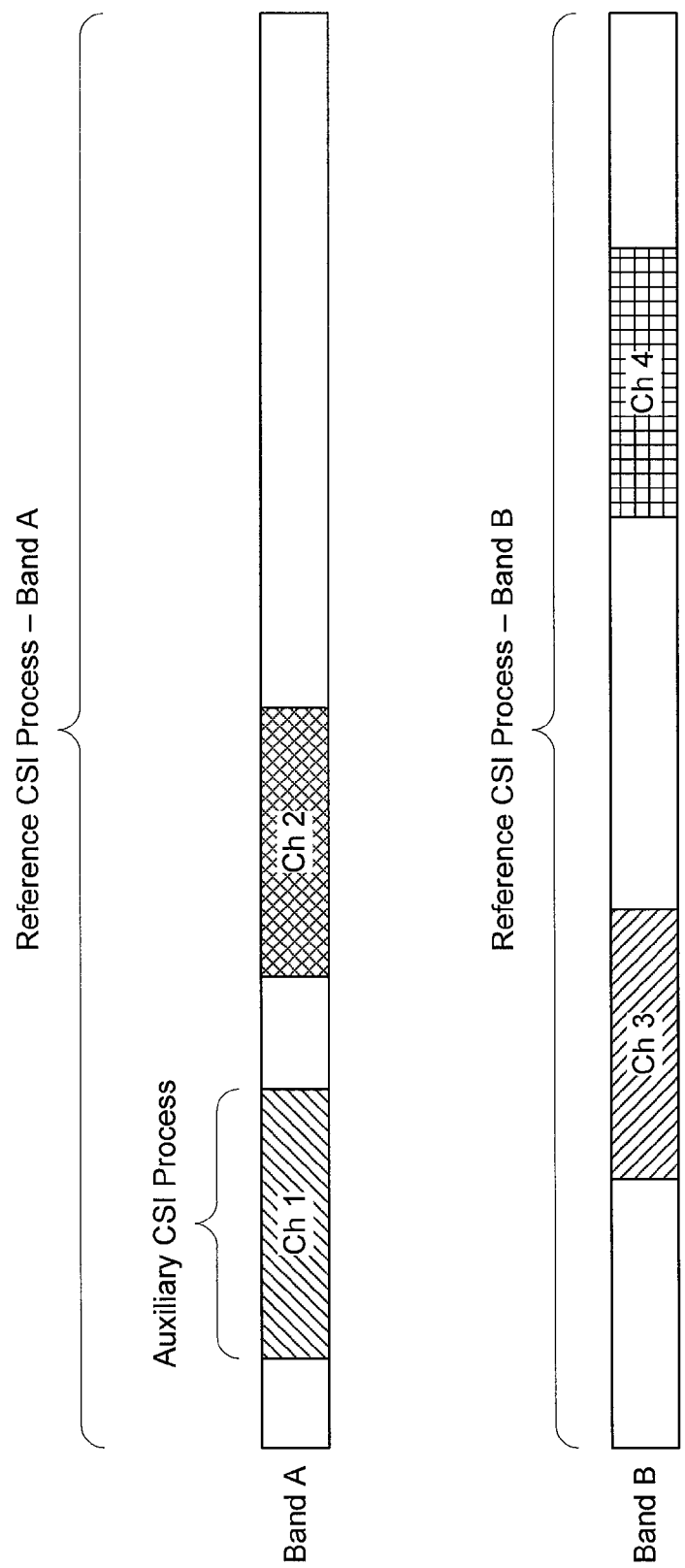

FIG. 6C is a block diagram illustrating multi-channel transmission bands configured according to one aspect of the present disclosure. The eNB would advertise the reference CSI processes for Bands A and B along with the power offset value, Pc, that should be used with the reference CSI processes. The eNB may then schedule the UEs it serves for communications on specific channels. For example, the eNB schedules one UE for communication on channel 1 of Band A. An auxiliary CSI process may be defined by the eNB transmitter for a particular subset of channels, for example, for channel 1, along with a specific power level or power offset value, Pc, that should be used specifically for that auxiliary CSI process. In the illustrated example, the auxiliary CSI process is defined in Band A for channel 1, which is one of two total channels supported by the eNB on Band B. Instead of equally spreading the maximum transmit power of Band B over both channels, the auxiliary CSI process is defined with a power offset of two times the power that would be defined for each channel in Band B (e.g., Pc for channel 1 would be two times the Pc identified for each of the two channels in Band B for the corresponding reference CSI process of Band B). The resulting CQI measured and reported by the UE will generally be more accurate according to the defined auxiliary CSI processes. However, there may be a tradeoff with the higher overhead used by the eNB for the defined auxiliary CSI processes.

It should be noted that when the auxiliary CSI processes are defined to be UE-specific, corresponding ZP-CSI-RS may be defined for rate-matching at other UEs in order to ensure that no data transmissions from the other UEs will interfere with the CSI-RS transmissions.

In operation with LTE/LTE-A systems having unlicensed spectrum, the reference CSI process is transmitted only for the channels on which the CCA clears. Because the transmission will have the same power on all channels, when the CCA clears on N out of M channels, the power for each channel may be scaled up by a factor of M/N. In case of such dynamic power scaling, however, the UE would not average the CSI across subframes. For example, with a 80 MHz-capable eNB operating on a band with a 30 dBm transmission power constraint, a reference CSI process would be defined across the entire 80 MHz with a transmit power of 30 dBm spread equally across each channel within the 80 MHz. An auxiliary CSI process for a single 20 MHz channel of the 80 MHz band could be defined for that 20 MHz channel with a transmit power of the total available 30 dBm.

Figure 7:
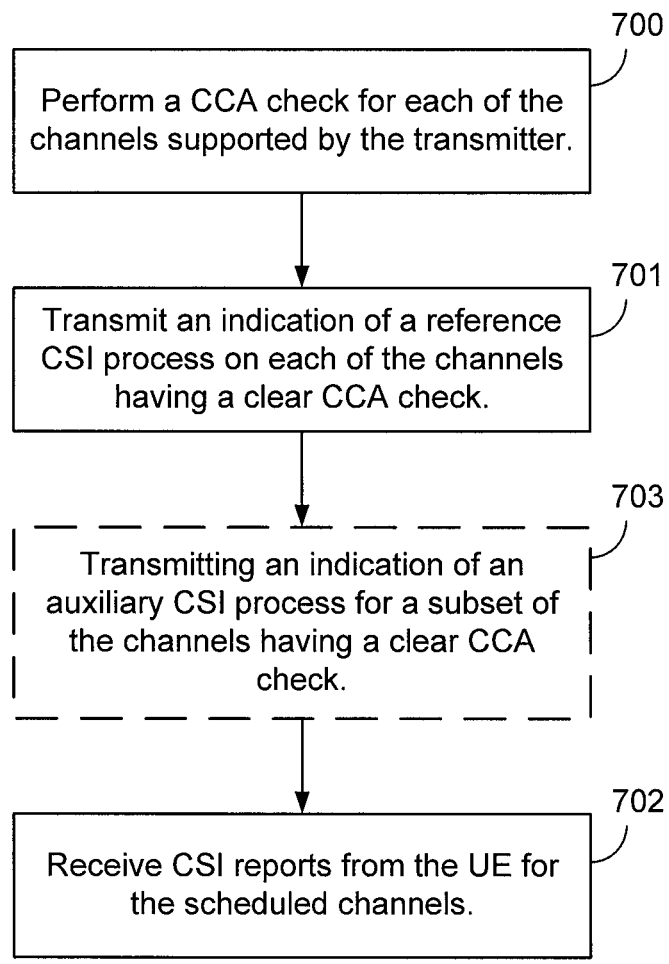
FIG. 7 is a block diagram illustrating example blocks executed to implement one aspect of the present disclosure.

FIG. 7 is a block diagram illustrating example blocks executed to implement one aspect of the present disclosure. At block 700, a transmitter performs a CCA check for each of the channels supported by the transmitter. The transmitter operates in a communication system, such as an LTE/LTE-A system with unlicensed spectrum. With the unlicensed spectrum, the transmitter perform the LBT procedures of the CCA check before transmitting anything on any of the supported channels.

At block 701, the transmitter transmits an indication of a reference CSI process on each of the channels in which a clear CCA was detected, where the reference CSI process defines the CSI process for each band that the transmitter operates on. Because the transmitter can only transmit on the channels after detecting a clear CCA, the transmitted message advertises the reference CSI processes for the cleared channels in the available bands.

At block 702, the transmitter will receive CSI reports from the UEs for the one or more of the channels. In various aspects, the transmitter may schedule any UEs for communication on one or more of the supported channels. Thus, the transmitter may schedule the UE for communication and performing the CSI processes on a subset or on all of the available supported channels.

In alternative aspects, when the transmitter schedules any of the UEs for a subset of the available channels, the transmitter may, at alternative block 703, transmit an indication of an auxiliary CSI process for the subset of channels scheduled for the UE by the transmitter. The auxiliary CSI process may be transmitted specifically to the UE that is scheduled for the subset of channels and will define the CSI process specifically for that subset of channels using a transmit power value that is appropriate for the subset of channels with respect to all of the channels in the particular band. The CSI report, received by the transmitter in block 702, may then, thus, be based on the reference CSI report, when the UE is scheduled for all of the available channels, or may be based on the auxiliary CSI report, when the UE is scheduled only for a subset of the available channels.

Figure 8:
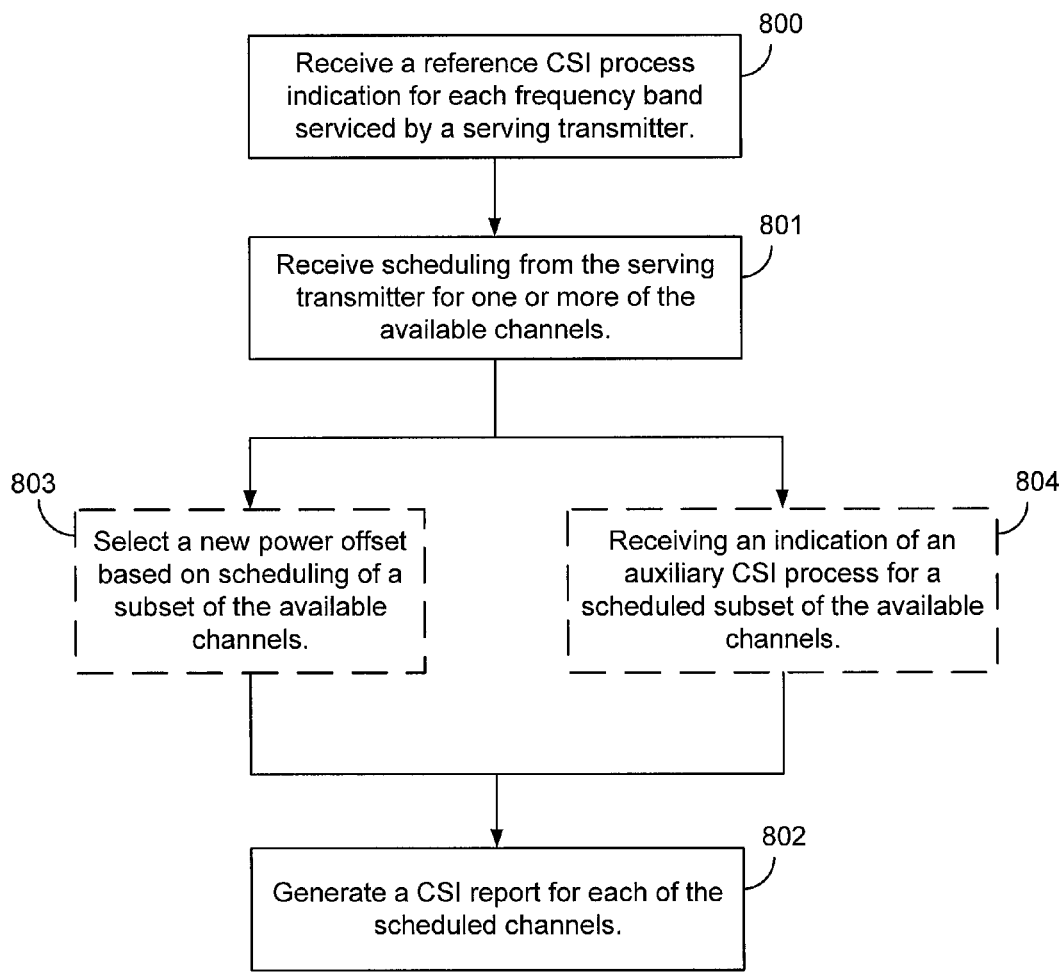
FIG. 8 is a block diagram illustrating example blocks executed to implement one aspect of the present disclosure.

FIG. 8 is a block diagram illustrating example blocks executed to implement one aspect of the present disclosure. At block 800, a receiver receives a reference CSI process indication for each frequency band serviced by a serving transmitter. The reference CSI process is applied to each available channel supported by the serving transmitter in each frequency band serviced by the transmitter.

At block 801, the receiver receives scheduling messages from the serving transmitter that schedules the receiver for communication and for performing the CSI processes on one or more of the available channels supported by the transmitter. At block 802, the receiver will generate a CSI report for each of the scheduled available channels, which may then be fed back through transmission to the transmitter.

If the transmitter, at block 801, schedules the receiver for a subset of the available channels, then, in one alternative aspect, at alternative block 803, the receiver selects a new power offset value based on the subset of the available channels scheduled. The new power offset value would correspond to a ratio of the number of channels in the subset scheduled in relation to the total number of available channels. Thus, as fewer channels are scheduled in a subset of the channels, the new power offset value would increase the power that the receiver uses in calculating the CSI for the CSI report.

In another alternative aspect, at alternative block 804, instead of selected a new power offset value, as in block 803, the receiver receives an indication of an auxiliary CSI process that is specifically defined by the transmitter for the scheduled subset of the available channels. The auxiliary CSI process would also include an appropriate power level to accommodate for the subset of scheduled available channels.

When transmitting the CSI feedback for the various reference CSI processes or auxiliary CSI processes, sending the feedback across all channels, carriers, or processes can be payload intensive. In order to relieve the payload overhead, the specific channels to send CSI reports for may be selected.

Figure 9:
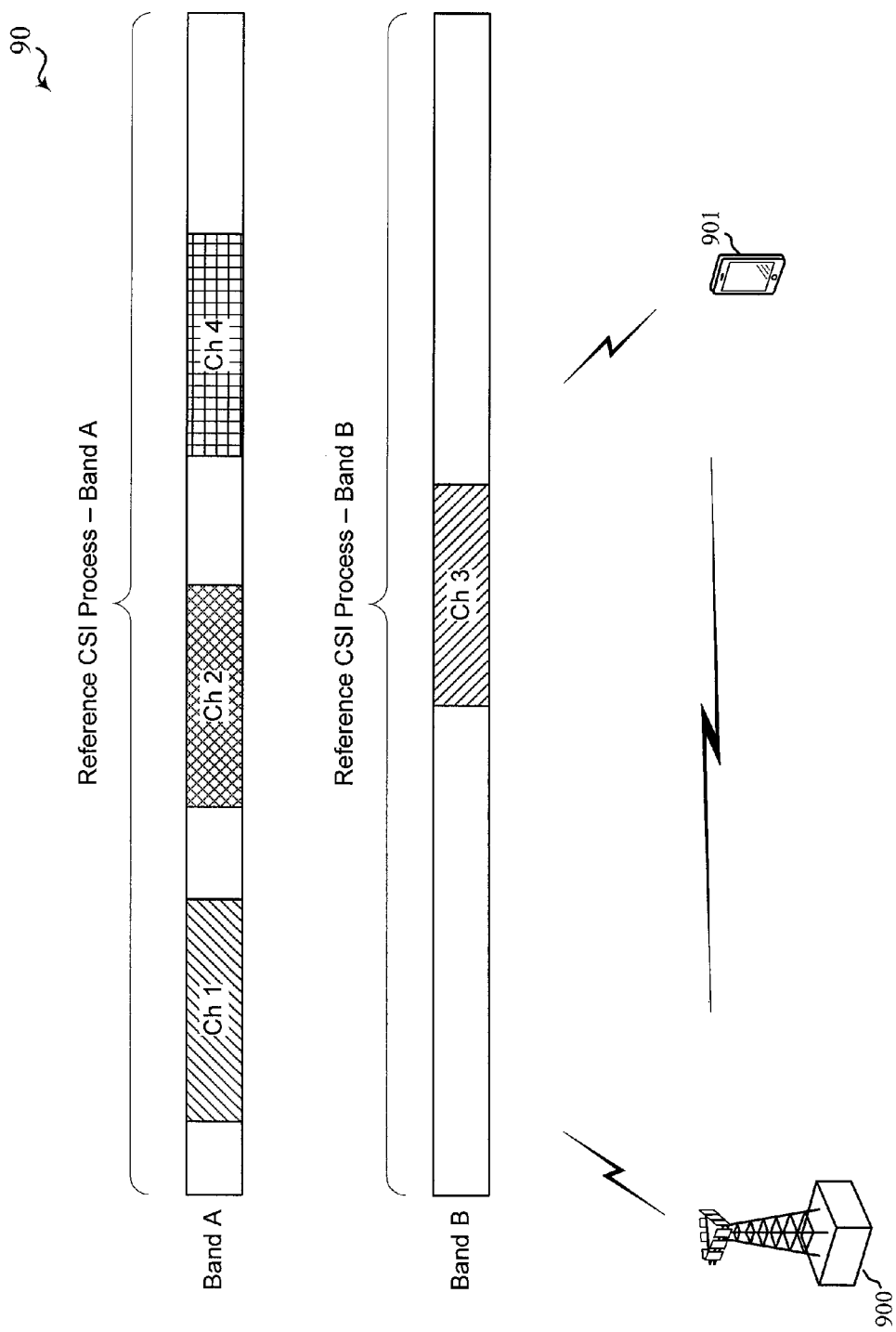
FIG. 9 is a block diagram illustrating a communication system configured according to one aspect of the present disclosure.

FIG. 9 is a block diagram illustrating a communication system 90 configured according to one aspect of the present disclosure. In communication system 90, eNB 900 supports four channels of communication, channels 1-4, that span two separate frequency bands, Band A and Band B. ENB 900 would transmit or broadcast system messages that advertise and indicate the reference CSI processes that apply to Bands A and B. ENB 900 would also transmit scheduling messages to UE 901, which schedule UE 901 for communication and for performing the CSI processes on particular channels, which could include all of channels 1-4 or a subset of the channels. When scheduled only for a subset, eNB 900 may either further transmit an indication of an auxiliary CSI process or, in alternative aspects, UE 901 may independently select a new power offset value, Pc, to use in calculating the CSI for transmission to eNB 900.

In a first optional aspect for compressing the amount of feedback that UE 901 would be responsible to transmit to eNB 900, the network may configure the particular set of channels that UE 901 should generate CSI reports for. For example, while eNB 900 may schedule UE 901 for communication on all of channels 1-4, a message is signaled from eNB 900 to UE 901 that UE 901 only needs to generate and transmit the CSI report for channels 1 and 3. Thus, the transmitter or eNB 900 would define for UE 901 the number of channels it wants UE 901 to generate CSI reports for, and the UE generates those reports on the specified channels.

Alternatively, UE 901 may select the "best" M channels for reporting CSI, where M is at least one. Here, identification of the best category of channels is provided by eNB 900, but UE 901 determines which channels then fall into the designated best category. Thus, eNB 900 may signal to UE 901 to send only the CSI reports for the two channels with the highest calculated CSI. In one operation, UE 901 may measure the CSI values for each of channels 1-4, but determine that the highest CSI values are for channels 1 and 2. UE 901 would then only transmit the CSI report for channels 1 and 2 to eNB 900.

It should be noted that "best" may be defined in a number of different ways. For example, best may mean the channels with the most favorable CSI measurements. Best may also mean the channels with the oldest or most stale CSI measurement or even the channels with the least variation in CSI over time. Thus, the transmitter would indicate the number of channels for the CSI processes and indicate the designated category of CSI reports to send. The UE would then determine which of the channels falls into the designated category and generate the CSI reports for those channels.

It should be noted that additional techniques to reduce payload may also apply, such as, for example, UE 901 may cycling through various CSI processes or cycling through a subset or all of channels 1-4 in a periodic manner. Additionally, UE 901 may choose which processes to send the CSI reports for using a prioritization scheme (e.g., Auxiliary CSI report can be prioritized over Reference CSI report, etc.). UE 901 may also prioritize the reporting based on the type of CSI process, but then drop the lower priority processes, instead of simply delaying the transmission of the lower priority processes.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C) or any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
performing a clear channel assessment (CCA) check for one or more channels supported by a transmitter on one or more frequency bands serviced by the transmitter;
transmitting indication of a reference channel state information (CSI) process on each of the one or more channels on which the CCA check is successful,
wherein the reference CSI process is applicable to the one or more channels within the one or more frequency bands, and
wherein a reference transmit power of the reference CSI process is indicated in the transmission as the maximum transmit power of each of the one or more frequency bands spread equally across the one or more channels of the corresponding one or more frequency bands; and
receiving a CSI report from a user equipment (UE) for each of the scheduled one or more of the one or more channels, wherein the CSI reports are based on one of:
the reference CSI process, when the scheduled one or more of the one or more channels is all of the one or more channels; or
a modified CSI report, when the scheduled one or more of the one or more channels is a scheduled subset of the one or more channels.

2. The method of claim 1, wherein the modified CSI report is computed using a received transmit power that is different than the reference transmit power indicated by the transmitter.

3. The method of claim 2, wherein the received transmit power is based, at least in part, on the scheduled subset of the one or more channels.

4. The method of claim 1, further including:
transmitting indication of an auxiliary CSI process, wherein the auxiliary CSI process is defined for one or more subsets of the one or more channels, and wherein an auxiliary transmit power for the auxiliary CSI process is indicated based on a corresponding subset of the one or more subsets,
wherein the modified CSI report is based on the auxiliary CSI process defined for the subset of the one or more channels.

5. The method of claim 4, wherein the auxiliary CSI process is transmitted to a designated UE of a plurality of UEs.

6. The method of claim 5, further including:
transmitting one or more CSI reference signals (CSI-RS) to each of the plurality of UEs other than the designated UE for rate-matching data transmissions of the plurality of UEs other than the designated UE.

7. The method of claim 1, wherein the reference transmit power of the reference CSI process is scaled according to a ratio of the one or more channels to the one or more channels on which the CCA check is successful.

8. The method of claim 7, wherein the CSI report is not averaged over all subframes of the one or more channels on which the CCA check is successful.

9. The method of claim 1, further including:
transmitting notification of a set of channels of the scheduled one or more of the one or more channels for the UE to transmit the corresponding CSI report.

10. The method of claim 1, further including:
transmitting a number of channels of the scheduled one or more of the one or more channels on which the UE is to provide the CSI reports; and
transmitting a CSI category on which the UE is to provide the CSI reports,
wherein the receiving the CSI report includes receiving a CSI report for each of the scheduled one or more of the one or more channels that meets the CSI category up to the number of channels.

11. The method of claim 10, wherein the CSI category includes one of:
a highest M values of CSI measurement, where M is at least one;
one or more channels having a most stale CSI value; or
one or more channels having a least variation of CSI over a predetermined window of time.

12. A method of wireless communication, comprising:
receiving indication of a reference channel state information (CSI) process on each of one or more frequency bands serviced by a serving transmitter,
wherein the reference CSI process is applicable to the one or more channels supported by the serving transmitter within the one or more frequency bands, and
wherein a reference transmit power of the reference CSI process is indicated as the maximum transmit power of each of the one or more frequency bands spread equally across the one or more channels of the corresponding one or more frequency bands;
receiving a schedule from the serving transmitter for one or more of the one or more channels; and
generating a CSI report for each of the scheduled one or more of the one or more channels, wherein each of the CSI reports is based on one of:
the reference CSI process, when the scheduled one or more of the one or more channels is all of the one or more channels; or
a modified CSI report, when the scheduled one or more of the one or more channels is a scheduled subset of the one or more channels.

13. The method of claim 12, wherein the scheduled one or more of the one or more channels is the subset of the one or more channels, the method further including:
transmitting the modified CSI report using a modified transmit power, wherein the modified transmit power is the reference transmit power scaled by a ratio of all of the one or more channels to the scheduled subset of the one or more channels.

14. The method of claim 12, further including:
receiving indication of an auxiliary CSI process, wherein the auxiliary CSI process is defined for one or more subsets of the one or more channels, and wherein an auxiliary transmit power for the auxiliary CSI process is indicated based on a corresponding subset of the one or more subsets,
wherein the modified CSI report is based on the auxiliary CSI process defined for the scheduled subset of the one or more channels.

15. The method of claim 12, wherein the indication of the reference transmit power of the reference CSI process indicates the reference transmit power was scaled based on at least one of the one or more channels in which the CCA check was unsuccessful.

16. The method of claim 15, wherein the generating the CSI report does not average the CSI over all subframes of the one or more channels on which the CCA check is successful.

17. The method of claim 12, further including:
selecting a set of channels, of the scheduled one or more of the one or more channels on which the CSI reports are generated to transmit a corresponding CSI report to the serving transmitter.

18. The method of claim 17, further including:
receiving the set of channels from the serving transmitter.

19. The method of claim 17, further including:
receiving a number of channels of the scheduled one or more of the one or more channels on which to provide the CSI report;
receiving a CSI category on which to provide the CSI report,
wherein the selecting includes determining which of the scheduled one or more of the one or more channels meets the CSI category; and
transmitting the CSI report for each of the scheduled one or more of the one or more channels that meets the CSI category up to the number of channels.

20. The method of claim 19, wherein the CSI category includes one of:
a highest value of CSI measurement;
one or more channels having a most stale CSI value; or
one or more channels having a least variation of CSI over a predetermined window of time.

21. The method of claim 17, wherein the selecting includes:
cycling transmission of each of the CSI reports generated for each of the scheduled one or more of the one or more channels, wherein the receiver transmits one of the CSI reports for the corresponding one of the scheduled one or more of the one or more channels at a time.

22. The method of claim 17, wherein the selecting includes:
prioritizing transmission of each of the CSI reports generated for each of the scheduled one or more of the one or more channels.

23. The method of claim 22, wherein the CSI reports for each of the scheduled one or more of the one or more channels that is not transmitted by the receiver within a predetermined time after the generating the CSI report is dropped by the receiver.

24. An apparatus configured for wireless communication, the apparatus comprising:
at least one processor; and
a memory coupled to the at least one processor,
wherein the at least one processor is configured:
to perform a clear channel assessment (CCA) check for one or more channels supported by a transmitter on one or more frequency bands serviced by the transmitter;
to transmit indication of a reference channel state information (CSI) process on each of the one or more channels on which the CCA check is successful,
wherein the reference CSI process is applicable to the one or more channels within the one or more frequency bands, and
wherein a reference transmit power of the reference CSI process is indicated in the transmission as the maximum transmit power of each of the one or more frequency bands spread equally across the one or more channels of the corresponding one or more frequency bands; and
to receive a CSI report from a user equipment (UE) for each of the scheduled one or more of the one or more channels, wherein the CSI reports are based on one of:
the reference CSI process, when the scheduled one or more of the one or more channels is all of the one or more channels; or
a modified CSI report, when the scheduled one or more of the one or more channels is a scheduled subset of the one or more channels.

25. The apparatus of claim 24, wherein the modified CSI report is computed using a received transmit power that is different than the reference transmit power indicated by the transmitter.

26. The apparatus of claim 25, wherein the received transmit power is based, at least in part, on the scheduled subset of the one or more channels.

27. The apparatus of claim 24, further including configuration of the at least one processor to transmit indication of an auxiliary CSI process, wherein the auxiliary CSI process is defined for one or more subsets of the one or more channels, and wherein an auxiliary transmit power for the auxiliary CSI process is indicated based on a corresponding subset of the one or more subsets, and wherein the modified CSI report is based on the auxiliary CSI process defined for the subset of the one or more channels.

28. An apparatus configured for wireless communication, the apparatus comprising:
at least one processor; and
a memory coupled to the at least one processor,
wherein the at least one processor is configured:
to receive indication of a reference channel state information (CSI) process on each of one or more frequency bands serviced by a serving transmitter,
wherein the reference CSI process is applicable to the one or more channels supported by the serving transmitter within the one or more frequency bands, and
wherein a reference transmit power of the reference CSI process is indicated as the maximum transmit power of each of the one or more frequency bands spread equally across the one or more channels of the corresponding one or more frequency bands;
to receive a schedule from the serving transmitter for one or more of the one or more channels; and
to generate a CSI report for each of the scheduled one or more of the one or more channels, wherein each of the CSI reports is based on one of:
the reference CSI process, when the scheduled one or more of the one or more channels is all of the one or more channels; or
a modified CSI report, when the scheduled one or more of the one or more channels is a scheduled subset of the one or more channels.

29. The apparatus of claim 28, wherein the scheduled one or more of the one or more channels is the subset of the one or more channels, the apparatus further including configuration of the at least one processor to transmit the modified CSI report using a modified transmit power, wherein the modified transmit power is the reference transmit power scaled by a ratio of all of the one or more channels to the scheduled subset of the one or more channels.

30. The apparatus of claim 28, further including configuration of the at least one processor to receive indication of an auxiliary CSI process, wherein the auxiliary CSI process is defined for one or more subsets of the one or more channels, and wherein an auxiliary transmit power for the auxiliary CSI process is indicated based on a corresponding subset of the one or more subsets, and wherein the modified CSI report is based on the auxiliary CSI process defined for the scheduled subset of the one or more channels.

* * * * *